(12) United States Patent
Chiranthan et al.

(10) Patent No.: US 11,719,438 B2
(45) Date of Patent: Aug. 8, 2023

(54) COMBUSTION LINER

(71) Applicant: General Electric Company, Schenectady, NY (US)

(72) Inventors: Ranganatha Narasimha Chiranthan, Karnataka (IN); Rimpie Rangrej, Karnataka (IN); Saket Singh, Karnataka (IN); Pradeep Naik, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 23 days.

(21) Appl. No.: 17/201,846

(22) Filed: Mar. 15, 2021

(65) Prior Publication Data

US 2022/0290861 A1 Sep. 15, 2022

(51) Int. Cl.
*F23R 3/00* (2006.01)
*F23R 3/06* (2006.01)
*B33Y 80/00* (2015.01)

(52) U.S. Cl.
CPC ............... *F23R 3/002* (2013.01); *F23R 3/06* (2013.01); *B33Y 80/00* (2014.12); *F23R 2900/03044* (2013.01)

(58) Field of Classification Search
CPC .... F23R 3/002; F23R 3/04; F23R 3/06; F23R 3/10; F23R 2900/03044
See application file for complete search history.

(56) References Cited

U.S. PATENT DOCUMENTS

| | | | |
|---|---|---|---|
| 7,546,737 B2 | 6/2009 | Schumacher et al. | |
| 8,161,752 B2 | 4/2012 | Yankowich et al. | |
| 8,739,546 B2 | 6/2014 | Snyder et al. | |
| 9,360,215 B2 | 6/2016 | McKenzie et al. | |
| 9,416,970 B2 | 8/2016 | Kirsopp et al. | |
| 9,625,152 B2 | 4/2017 | Papple et al. | |
| 9,810,430 B2 | 11/2017 | Sandoval et al. | |
| 9,851,105 B2 | 12/2017 | Propheter-Hinckley et al. | |
| 9,976,743 B2 | 5/2018 | Propheter-Hinckley et al. | |
| 10,502,422 B2 | 12/2019 | Cunha et al. | |
| 10,578,305 B2 | 3/2020 | Deiss et al. | |
| 10,753,283 B2 * | 8/2020 | Lao | F02C 7/24 |
| 10,760,436 B2 * | 9/2020 | Commaret | F02C 7/04 |

(Continued)

FOREIGN PATENT DOCUMENTS

| | | |
|---|---|---|
| EP | 3132202 B1 | 9/2018 |
| EP | 3431875 A1 | 1/2019 |

(Continued)

*Primary Examiner* — Arun Goyal
*Assistant Examiner* — Henry Ng
(74) *Attorney, Agent, or Firm* — Venable LLP; Elizabeth C. G. Gitlin; Michele V. Frank

(57) ABSTRACT

A liner for a combustor in a gas turbine engine. The liner may include a liner body having a cold side and a hot side. The liner may include a dilution opening and a passage extending through the liner body. The passage may be positioned adjacent the dilution opening. The passage may be angled with respect to an interior surface of the liner body. A dilution flow may flow through the dilution opening from the cold side to the hot side and a secondary flow may flow through the passage from the cold side to the hot side. The secondary flow may exit into the hot side behind the dilution flow and may suppresses wakes formed behind the dilution flow on the hot side of the liner.

18 Claims, 8 Drawing Sheets

(56) References Cited

U.S. PATENT DOCUMENTS

| | | | |
|---|---|---|---|
| 2010/0122537 A1 | 5/2010 | Yankowich et al. | |
| 2013/0074505 A1 | 3/2013 | Toronto et al. | |
| 2013/0078582 A1* | 3/2013 | Pidcock | F23R 3/06 |
| | | | 431/12 |
| 2015/0323182 A1* | 11/2015 | Sandoval | F23R 3/06 |
| | | | 60/752 |
| 2015/0354819 A1* | 12/2015 | Snyder | F02C 7/18 |
| | | | 60/754 |
| 2016/0025342 A1* | 1/2016 | Erbas-Sen | F02C 7/18 |
| | | | 415/178 |
| 2016/0097325 A1 | 4/2016 | Harding et al. | |
| 2016/0201908 A1 | 7/2016 | Drake et al. | |
| 2016/0209035 A1* | 7/2016 | Cramer | F23R 3/045 |
| 2016/0327272 A1* | 11/2016 | Sandoval | F23R 3/50 |
| 2016/0377289 A1* | 12/2016 | Kostka, Jr. | F23R 3/04 |
| | | | 60/752 |
| 2017/0059162 A1* | 3/2017 | Papple | F23R 3/06 |
| 2017/0096900 A1* | 4/2017 | Bunker | F01D 9/04 |
| 2017/0108220 A1* | 4/2017 | Kostka, Jr. | F23R 3/06 |
| 2018/0112878 A1 | 4/2018 | Pacheco-Tougas et al. | |
| 2018/0283689 A1* | 10/2018 | Wang | F23R 3/06 |
| 2019/0170352 A1 | 6/2019 | Wilson et al. | |

FOREIGN PATENT DOCUMENTS

| | | |
|---|---|---|
| EP | 3006671 B1 | 3/2019 |
| WO | 2016156370 A1 | 10/2016 |

\* cited by examiner

COMBUSTION LINER

TECHNICAL FIELD

The present disclosure relates to a combustion liner. In particular, the present disclosure relates to a combustion liner having dilution openings and passages around the dilution openings.

BACKGROUND

A gas turbine engine may include a combustion section having a combustor that generates the combustion gases discharged into the turbine section of the engine. The combustion section may include combustion liner. Current combustion liners include dilution openings in the liner. The dilution openings may provide dilution air flow to the combustor. The dilution air flow may mix with fuel flow within the combustor.

BRIEF SUMMARY

According to an embodiment, a liner for a combustor in a gas turbine engine comprises a liner body having a cold side and a hot side; a dilution opening extending through the liner body; and a passage positioned adjacent the dilution opening and extending through the liner body, wherein a dilution flow flows through the dilution opening from the cold side to the hot side and a secondary flow flows through the passage from the cold side to the hot side, wherein the secondary flow exits into the hot side behind the dilution flow, and wherein the secondary flow suppresses wakes formed behind the dilution flow on the hot side of the liner.

According to an embodiment, a method for suppressing wakes in a dilution flow comprises flowing a dilution air flow from a cold side of a liner to a hot side of a liner; flowing a secondary air flow from the cold side of the liner to the hot side of the liner; and mixing the dilution air flow and the secondary air flow with a primary air cross flow flowing through the hot side of the liner, wherein the secondary air flow comes around the dilution air flow and enters the hot side behind the dilution air flow, wherein the secondary air flow suppresses a wake present behind the dilution air flow, and wherein a vortex pair is formed due to the secondary air flow mixes with the dilution air flow, the vortex pair assisting in mixing with the primary air cross flow.

Additional features, advantages, and embodiments of the present disclosure are set forth or apparent from consideration of the following detailed description, drawings and claims. Moreover, it is to be understood that both the foregoing summary of the embodiments and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the disclosure are discussed in detail below. While specific embodiments are discussed, this is done for illustration purposes only. A person skilled in the relevant art will recognize that other components and configurations may be used without departing from the spirit and scope of the present disclosure.

The liner of the present disclosure may be a combustion liner comprising one or more dilution openings permitting flow of dilution air therethrough from a cold side of the liner to a hot side of the liner. The dilution flow may mix with a primary cross flow within the liner. The liner may further include passages, such as, one or two passages adjacent to one or more of the dilution openings. In the case of two passages, the passages may be provided on opposing sides of a respective dilution opening. The passages may be angled with respect to an inner liner wall. The passages may have slots that permit a secondary air flow from the cold side to the hot side of the liner. The secondary air flow may be an air flow in addition to the primary cross flow in the liner and the dilution air flow through the dilution openings. The secondary flow may suppress wakes in the dilution flow and may enhance mixing within the liner. Thus, the liner of the present disclosure provides for a dilution openings that reduce emissions, suppress and eliminate wakes created by the dilution openings, and reduce hot temperatures on the liner.

Figure 1:
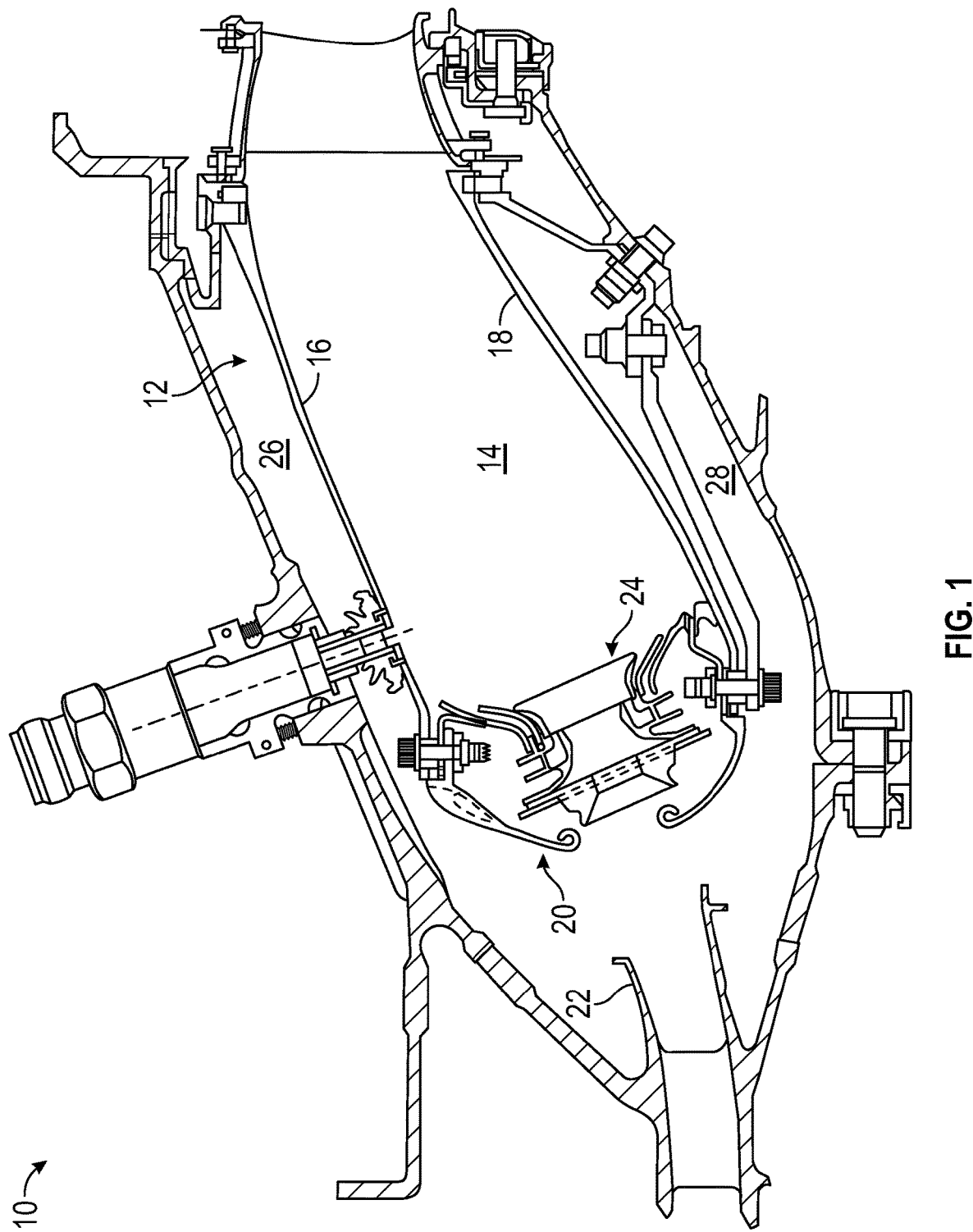
FIG. 1 shows a schematic, cross-section view of a combustion section of a gas turbine engine, according to an embodiment of the present disclosure.

FIG. 1 shows a schematic, cross-sectional view of a combustion section 10 of an engine, such as, for example, a gas turbine engine. The combustion section 10 may include a combustor 12 that generates the combustion gases discharged into the turbine section (not shown) of the engine.

The combustor 12 may include a combustion chamber 14 that may be bound by an outer liner 16, an inner liner 18, and a cowl 20. Additionally, a diffuser 22 may be positioned upstream of the combustion chamber 14. The diffuser 22 may receive an airflow from the compressor section (not shown) of the engine and may provide the flow of compressed air to the combustor 12. The diffuser 22 may provide the flow of compressed air to cowl 20 of a swirler 24. Air may flow through an outer passage 26 and an inner passage 28.

Figure 2A:
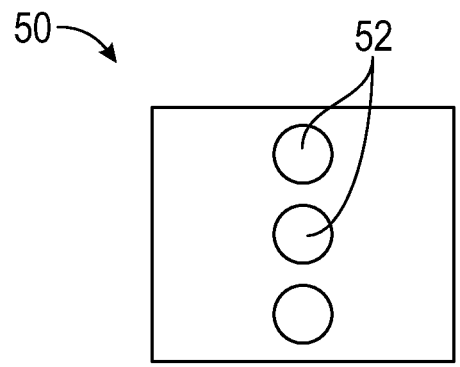
FIG. 2A shows schematic top view of a liner for a combustor, according to an embodiment of the present disclosure.
Figure 2B:
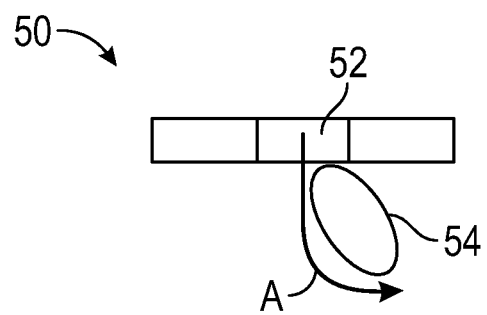
FIG. 2B shows a schematic side view of the liner of FIG. 2A, according to an embodiment of the present disclosure.

Referring to FIGS. 2A and 2B, a schematic top view of a liner 50 is shown. The liner 50 may be a conventional liner for a combustor, such as combustor 12, of a gas turbine engine. The liner 50 may be located as the outer liner 16 in FIG. 1. The liner 50 may include one or more openings 52, also referred to as dilution openings 52. An air flow A, also referred to as a dilution flow A or a dilution air flow A, may flow through the dilution openings 52 from an outer passage (e.g., outer passage 26 of FIG. 1) into the combustion chamber (e.g., combustion chamber 14 of FIG. 1). One or more dilution openings 52 may be provided in the liner 50.

The liner 50 of FIGS. 2A and 2B may result in low dilution flow penetration. That is, the dilution flow may not provide efficient mixing of the dilution air with the products from the primary zone of the combustor. This may result in high or increased nitrogen oxide emissions, as compared to the liners of the present disclosure. Furthermore, wakes may be located behind the dilution jets that is zone 54 (FIG. 2B). The wakes in zone 54 may cause the product to reside in the wakes for a long time, also increasing the nitrogen oxide emissions as compared to the liners of the present disclosure. The liner 50 and arrangement of dilution openings 52 may result in higher liner temperatures behind the dilution air jet, as compared to the liners of the present disclosure.

Figure 3A:
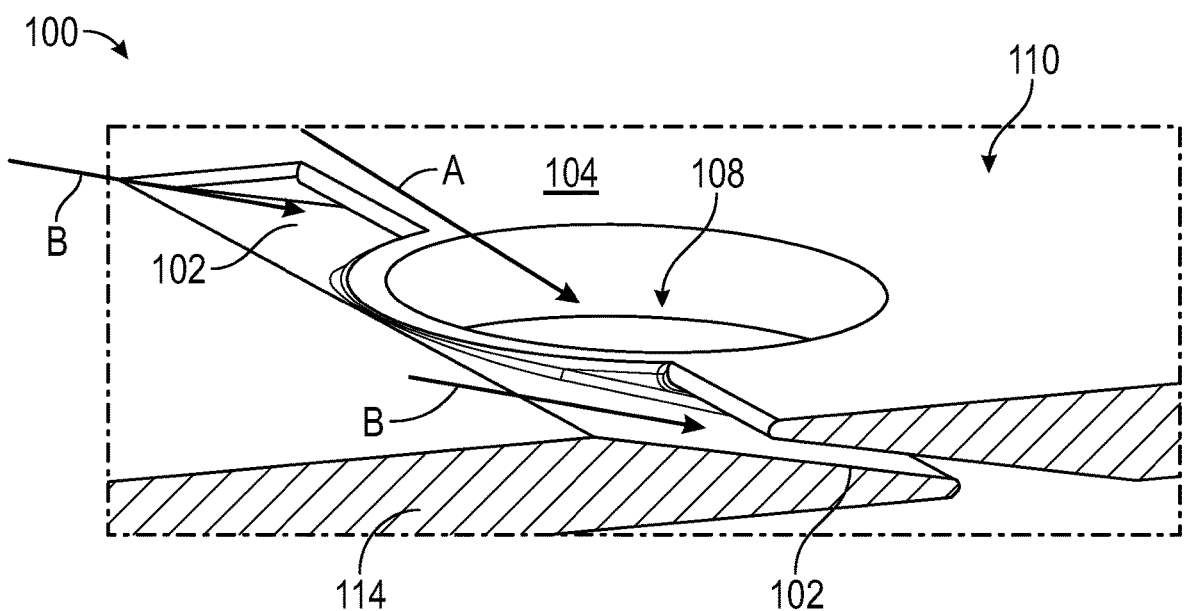
FIG. 3A shows a schematic, top perspective view of a liner for a combustor, according to an embodiment of the present disclosure.
Figure 3B:
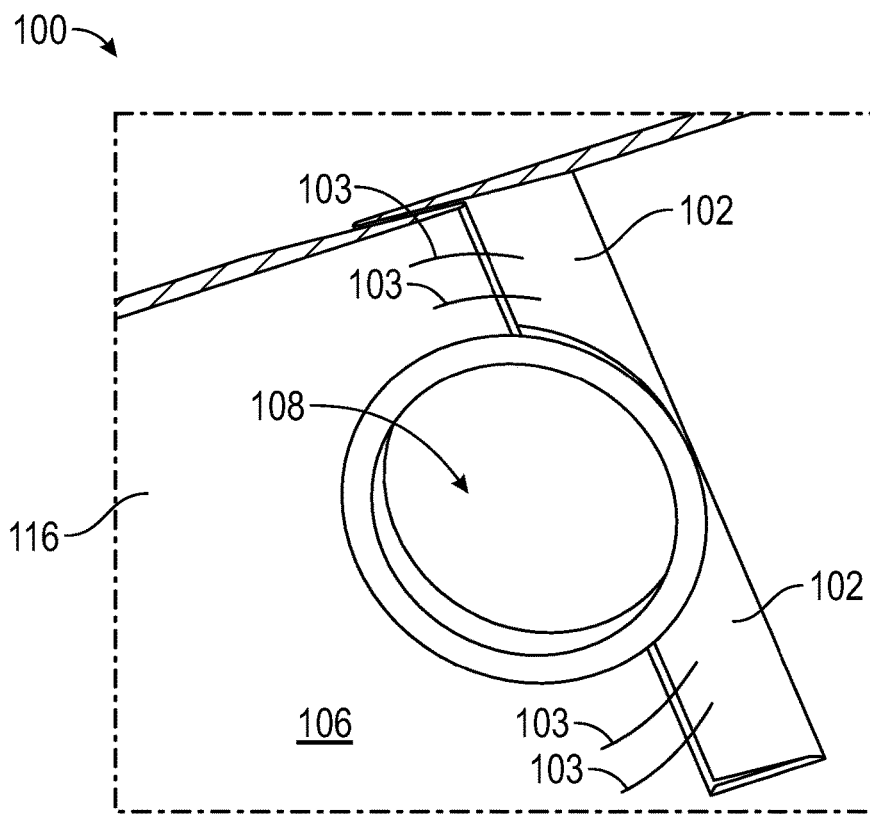
FIG. 3B shows a schematic, bottom perspective view of the liner of FIG. 3A, according to an embodiment of the present disclosure.

Referring to FIGS. 3A-3D, schematic views of a liner 100 of the present disclosure are shown. The liner 100 may be located as the outer liner 16 in FIG. 1. The liner 100 may be a continuous, split liner. That is, the liner 100 may be a continuous liner that includes a passage 102 extending from a cold side 104 of the liner (FIG. 3A) to a hot side 106 of the liner (FIG. 3B). The liner 100 may include an opening 108, also referred to as a dilution opening 108. The dilution opening 108 may be the same or similar as the dilution opening 52. Although a single dilution opening 108 is shown, more may be provided in the liner 100. The dilution opening 108 may be circular, elliptical, teardrop, racetrack, or other shapes.

Figure 3C:
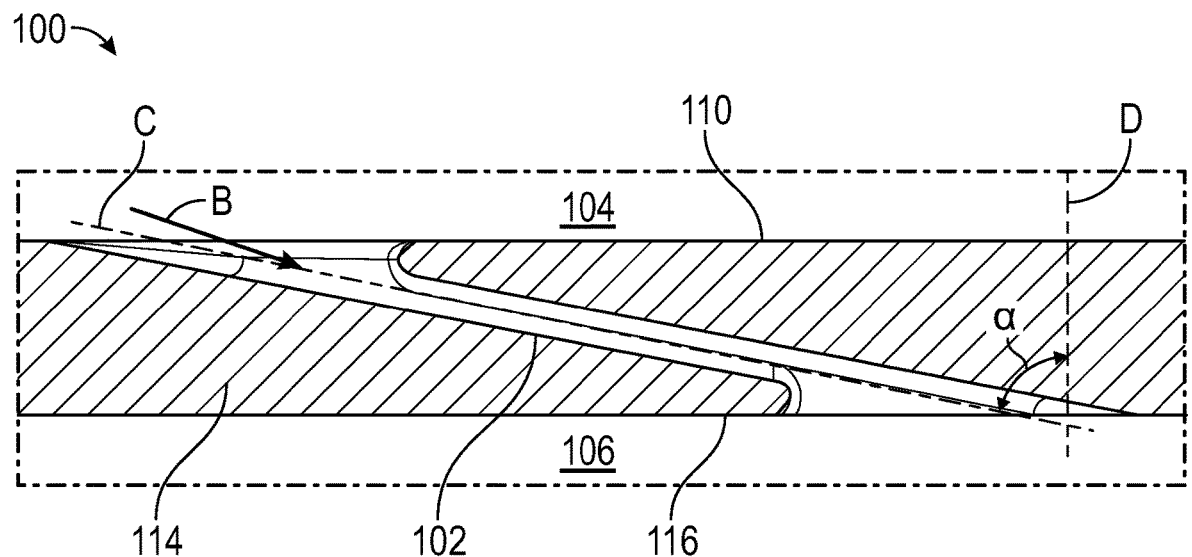
FIG. 3C shows a schematic, cross-section view through a passage of the liner of FIG. 3A, according to an embodiment of the present disclosure.

Referring to FIGS. 3A-3C, the passage 102 may extend from an upper surface 110 of the liner 100 (e.g., the surface 110 on the cold side 104) through a body 114 of the liner 100 to a lower surface 116 of the liner 100 (e.g., the surface 116 on the hot side 106). The inlet of the passage 102 may be provided at a leading edge or forward side of the dilution opening 108, as shown in FIG. 3A. A passage 102 may be provided on a single side of the dilution opening 108. The passage 102 may be provided on opposing sides of the dilution opening 108, as shown in FIG. 3A. Thus, every dilution opening 108 may include two passages 102 on either side of the dilution opening 108.

With continued reference to FIGS. 3A-3D, a dilution flow A, also referred to as a dilution air jet, a dilution air flow, and a dilution jet, may flow through the dilution opening 108. A secondary flow B may flow through the passages 102. A cross flow C (shown in FIG. 3D) may flow through the combustion chamber within the liner 100. The dilution flow A may be a discrete jet of flow from the discrete dilution opening 108. The dilution flow A may provide higher penetration into the interior of the liner 100 (e.g., the dilution flow A may extend toward the center of the combustion chamber) as compared to the secondary flow B from the flow passages 102. The secondary flow B may be a lower penetration (as compared to dilution flow A) annular trim-jet for mixing of hot streaks in the combustion chamber. The secondary flow B may be angled to stay near the inner wall of the liner 100 or may be angled towards the center of the liner 100 to increase penetration.

Figure 3D:
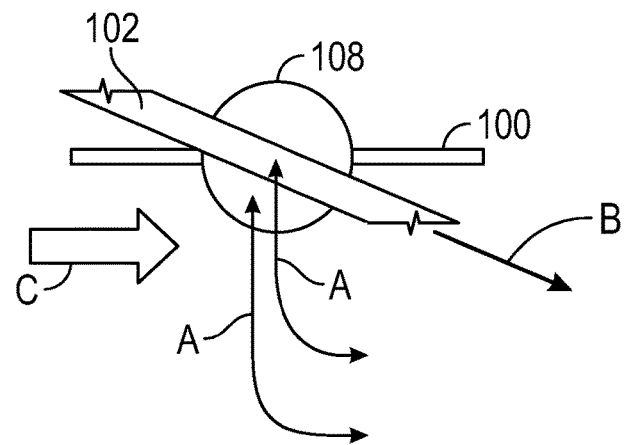
FIG. 3D shows a schematic view of the flows in the liner of FIG. 3A, according to an embodiment of the present disclosure.

The liner 100 may provide for a split liner having discrete dilution jets (e.g., flow A through dilution openings 108) combined with side slots (e.g., passages 102). The dilution openings 108 and the passages 102 may be separate openings/passages. For example, the dilution openings 108 and the passages 102 may not intersect. The dilution openings 108 and the passages 102 may not be fluidly coupled (except where they mix within the liner 100). As shown in FIG. 3D, the secondary flow B may be introduced to the combustion chamber behind the dilution flow A (e.g., the secondary flow B may be introduced aft of the dilution flow A). This arrangement may allow for flow around the dilution jets (e.g., flow A) and thereby may eliminate wakes behind the dilution jet, reducing the region of high temperature and thus reducing nitrogen oxide emissions. The passages 102 may be provided with a predetermined, desired direction to achieve the purpose of suppressing hot streaks escaping between the dilution jet, eliminating wakes behind dilution jets and shielding the hot side 106 of the liner 100.

The liner 100 having the dilution openings 108 combined with the passages 102 may be formed into the liner material (e.g., the liner metal) or may be separately manufactured and inserted into the liner. The angle $\alpha$ (shown in FIG. 3C) of the passages 102 may be varied. The angle $\alpha$ may be preselected or predetermined to maintain the exit opening of the passage 102 behind the dilution opening 108. In this manner, the secondary flow B may be discharged behind the dilution flow A. The angle $\alpha$ may be the angle between an axis C aligned with the passage 102 of the liner 100 and an axis D arranged perpendicular to the lower surface 116 of the liner 100. An exit direction of the jets/flows from the passages 102 may be changed. The exit direction may be selected or predetermined based on the penetration desired into the hot side region. Metal may be provided around the dilution openings 108 and in between the passages 102 to provide structural support and/or to direct the flow through the passage 102.

The liner 100 may provide better dilution quench and mixing as compared to the liner 50 of FIG. 1. The liner 100 may assist in achieving lower nitrogen oxide emissions as compared to the liner 50. The liners 100 may be additively manufactured (e.g., with 3D printing) with the dilution openings 108 and passages 102 manufactured therein with the additive manufacturing of the liner. Alternatively, the liners 100 having openings 108 and passages 102 may be manufactured as a separate insert.

Figure 4:
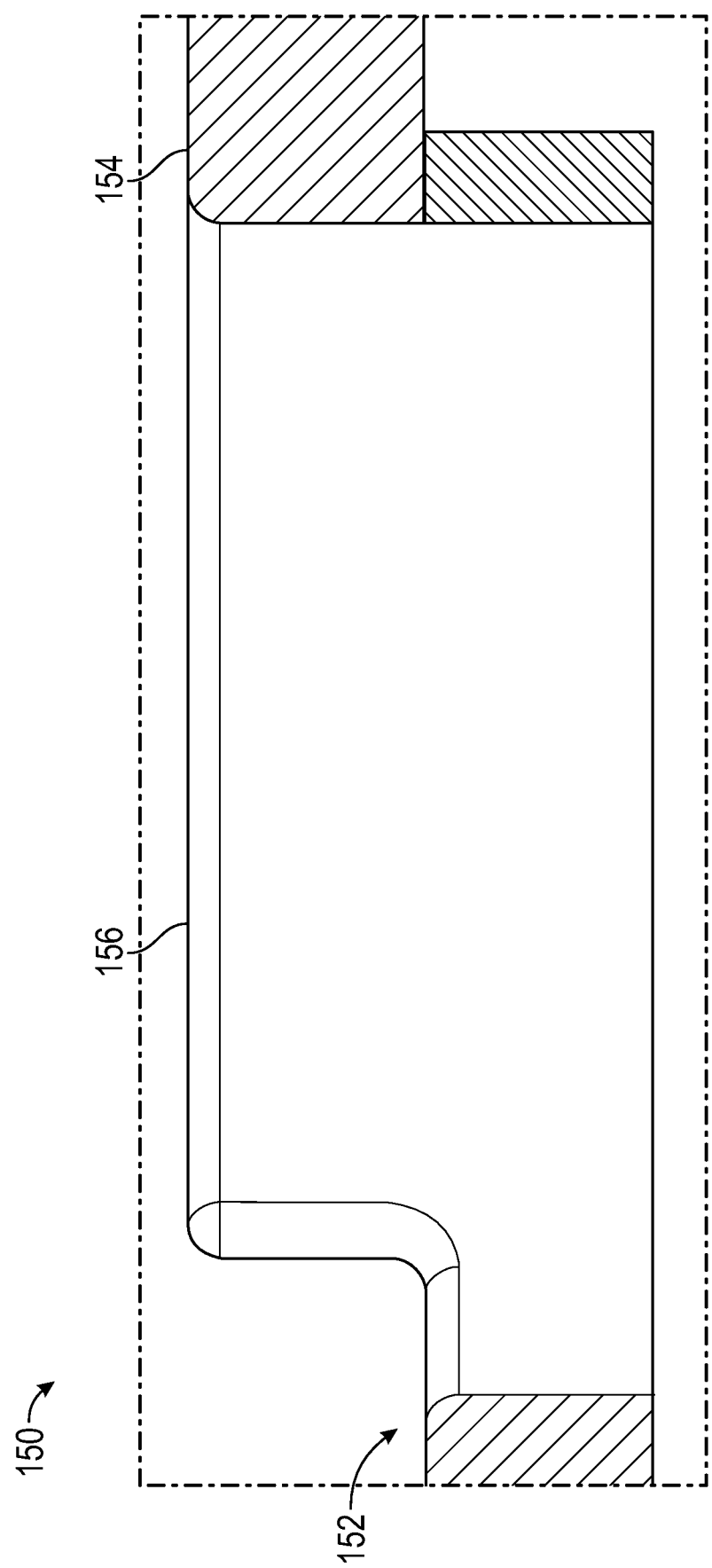
FIG. 4 shows a schematic, cross-section view through a dilution opening of a stepped liner for a combustor, according to an embodiment of the present disclosure.

Referring to FIG. 4, a schematic cross-section view of a liner 150 taken through a dilution opening is shown. The liner 150 may be a stepped liner. That is, the liner 150 may have a first portion 152 and a second portion 154 that is offset from the first portion 152. The dilution opening 156 may extend through both the first portion 152 and the second portion 154. In the cross-section view of the liner 150, such as shown in FIG. 4, the liner 150 may appear in a stepped manner. The liner 150 may exhibit the same disadvantages as the liner 50 of FIGS. 2A and 2B. For example, the liner 150 may result in low dilution flow penetration, may not provide efficient mixing of the dilution air with the products from the primary zone of the combustor, may have high or increased nitrogen oxide emissions, may generate wakes located behind the dilution flow that may further increase nitrogen oxide emissions, and may result in higher liner temperatures behind the dilution flow.

Figure 5A:
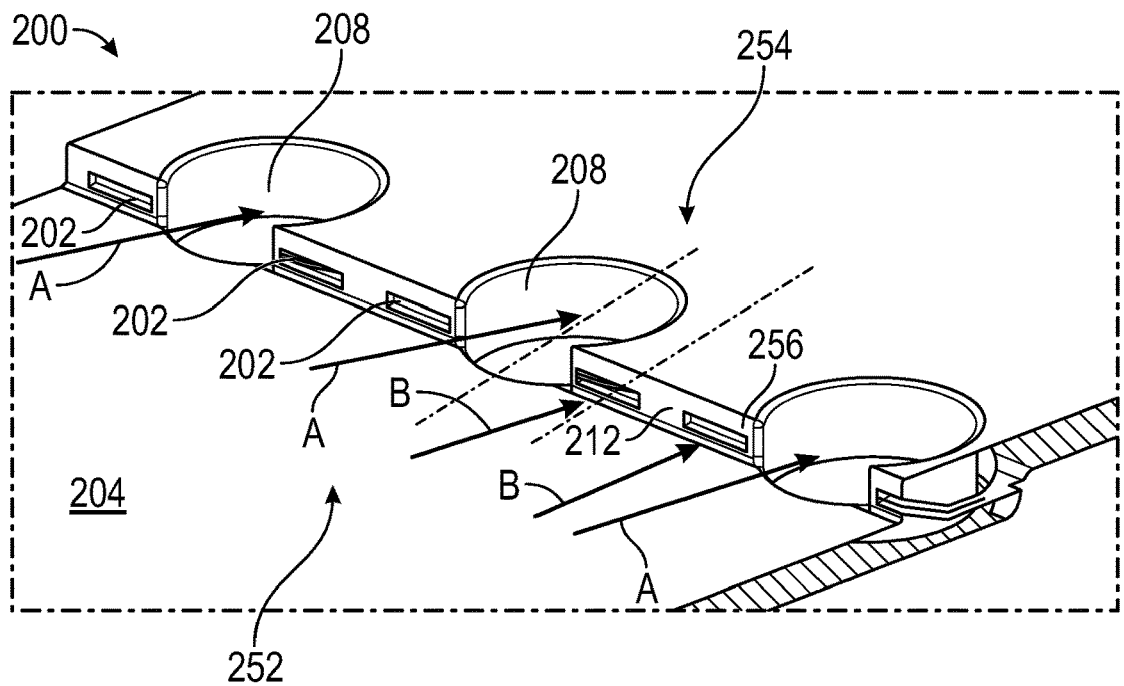
FIG. 5A shows a schematic, top perspective view of a stepped liner for a combustor, according to an embodiment of the present disclosure.
Figure 5B:
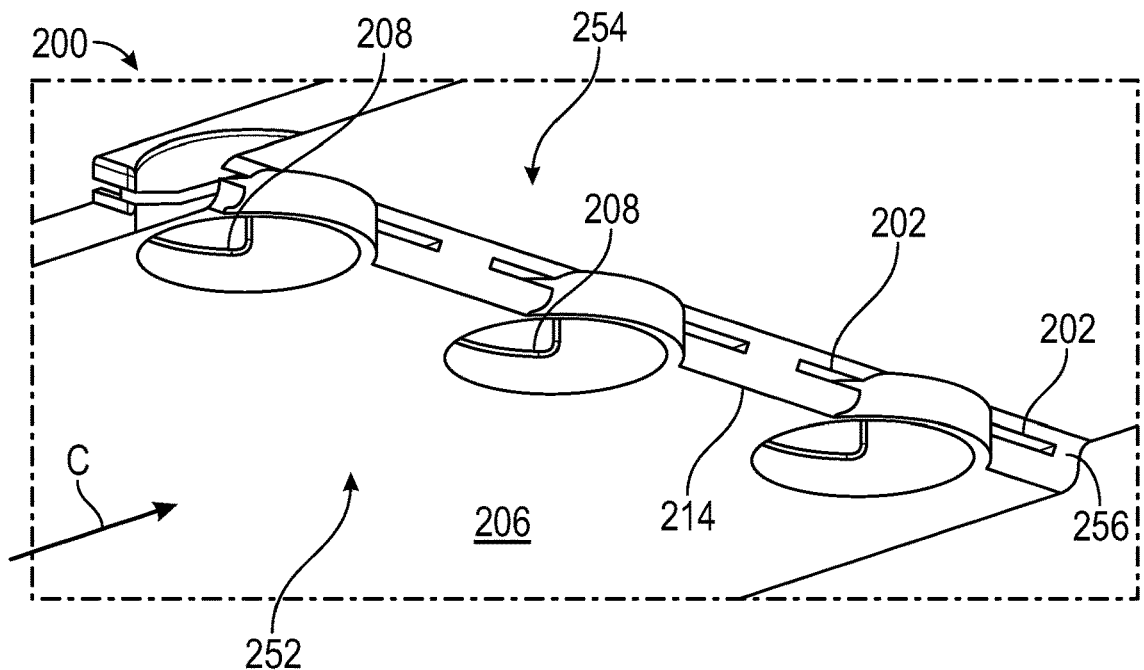
FIG. 5B shows a schematic, bottom perspective view of the stepped liner of FIG. 5A, according to an embodiment of the present disclosure.
Figure 5C:
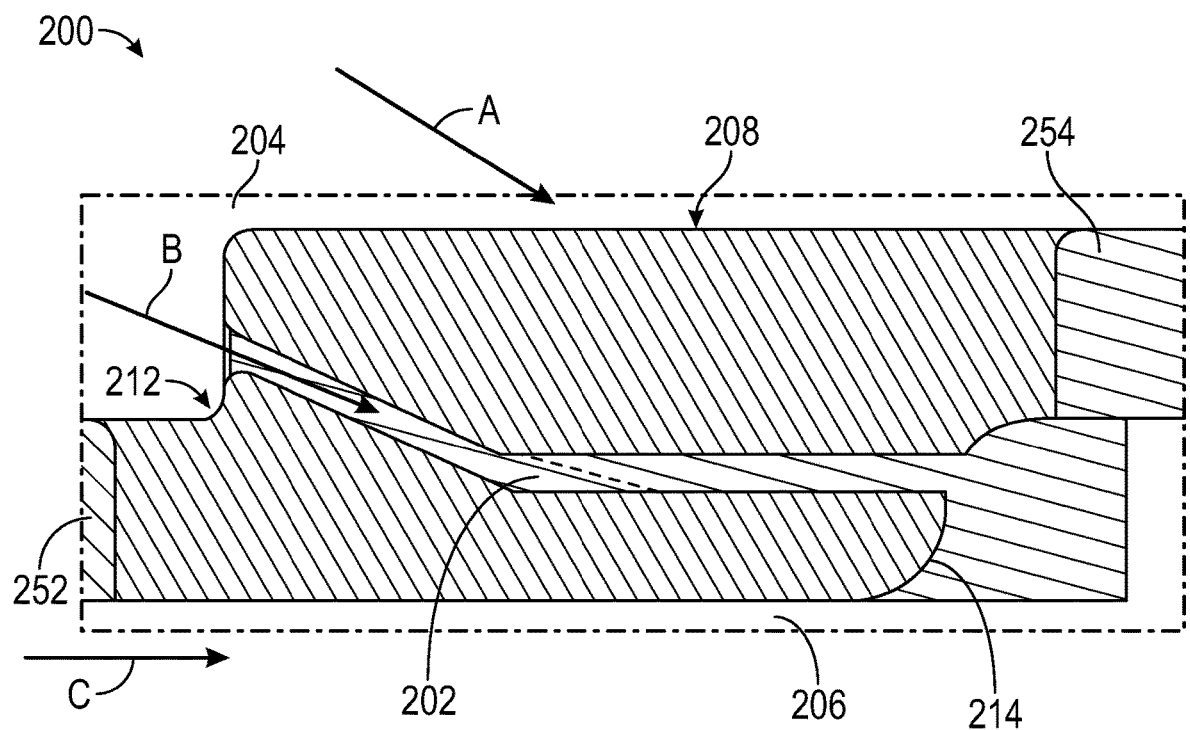
FIG. 5C shows a schematic, cross-section view through a passage of the stepped liner of FIG. 5A, according to an embodiment of the present disclosure.

FIGS. 5A-5C show schematic views of a liner 200 of the present disclosure are shown. The liner 200 may be located as the outer liner 16 in FIG. 1. The liner 200 may be a continuous stepped liner. For example, the liner 200 may be a continuous liner that includes a first portion 252 and a second portion 254 that is offset from the first portion 252. A passage 202 may extend from a cold side 204 of the liner (FIG. 5A) to a hot side 206 of the liner 200 (FIG. 5B). The passage 202 may be generally rectangular in cross-section. The liner 200 may include an opening 208, also referred to as a dilution opening 208. Although three dilution openings 208 are shown, more or fewer may be provided in the liner 200.

The inlet of the passage 202 may be provided at a leading edge or forward side of the dilution opening 208, as shown in FIG. 5A. The dilution openings 208 and the passages 202 may be separate openings/passages. For example, the dilution openings 208 and the passages 202 may not intersect. The dilution openings 208 and the passages 202 may not be fluidly coupled (except where they mix within the liner 200).

With continued reference to FIGS. 5A-5C, the passage 202 may extend from a first side surface 212 of the liner 200 on the cold side 204 to a second side surface 214 on the hot side 206. The first side surface 212 and the second side surface 214 may define a third portion 256 that couples the first portion 252 to the second portion 254. The passage 202 may be provided on a single side of the dilution opening 208. The passage 202 may be provided on opposing sides of the dilution opening 208, as shown in FIGS. 5A and 5B. Thus, every dilution opening 208 may include two passages 202 on either side of the dilution opening 208.

Referring again to FIGS. 5A-5C, a dilution flow A may flow through the dilution opening 208. A secondary flow B may flow through the passages 202. A cross flow C may flow through the combustion chamber within the liner 200. As discussed previously, the dilution flow A may be a discrete jet of flow from the discrete dilution opening 208. The dilution flow A may provide higher penetration into the interior of the liner 200 (e.g., the dilution flow A may extend toward the center of the combustion chamber) as compared to the secondary flow B from the flow passages 202. The secondary flow B may be a lower penetration (as compared to dilution flow A) annular trim jet for mixing of hot streaks in the combustion chamber. The secondary flow B may be angled to stay near the inner wall of the liner 200 or may be angled towards the center of the liner 200 to increase penetration.

The liner 200 may provide for a stepped liner having discrete dilution jets (e.g., flow A through dilution openings 208) combined with side slots (e.g., passages 202). As is described previously, the secondary flow B may be introduced to the combustion chamber behind the dilution flow A. This arrangement may allow for flow around the dilution jets and thereby may eliminate wakes behind the dilution jet, reducing the region of high temperature and thus reducing nitrogen oxide emissions. The passages 202 are provided with a predetermined, desired direction to achieve the purpose of suppressing hot streaks escaping between the dilution jet, eliminating wakes behind dilution jets and shielding the hot side 206 of the liner 200.

As with the liner 100, the liner 200 having the dilution openings 208 combined with the passages 202 may be formed into the liner material (e.g., the liner metal) or may be separately manufactured and inserted into the liner. The orientation and angle of the passage 202 (e.g., as shown in the profile of FIG. 5C) may be varied. The orientation and angle may be preselected or predetermined to maintain the exit opening of the passage 202 behind the dilution opening 208. In this manner, the secondary flow B may be discharged behind the dilution flow A. An exit direction of the jets/flows from the passages 202 may be changed. The exit direction may be selected or predetermined based on the penetration desired into the hot side region. Metal may be provided around the dilution openings 208 and in between the passages 202 to provide structural support and/or to direct the flow through the passage 202.

The liner 200 may provide better dilution quench and mixing as compared to the liner 150 of FIG. 4. The liner 200 may assist in achieving lower nitrogen oxide emissions as compared to the liner 150. The liner 200 may be additively manufactured (e.g., with 3D printing) with the dilution openings 208 and passages 202 manufactured therein with the additive manufacturing of the liner. Alternatively, the liner 200 having openings 208 and passages 202 may be manufactured as a separate insert.

Figure 6:
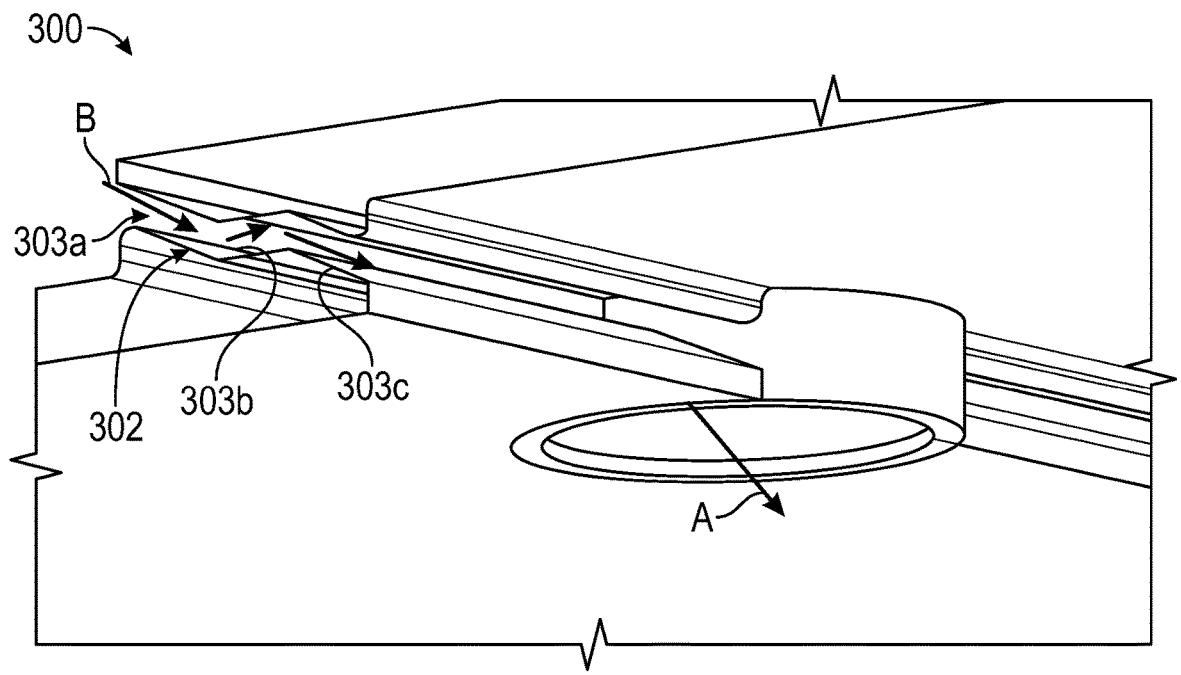
FIG. 6 shows a schematic, bottom perspective view of a stepped liner, according to an embodiment of the present disclosure.

Referring to FIG. 6, a schematic view of a passage 302 in a stepped liner 300 is shown. The stepped liner 300 may be the same or similar as the stepped liner 200. In the stepped liner 300, the passage 302 may have a profile that includes a first angled portion 303a, a lateral portion 303b, and a second angled portion 303c. The characteristics of the stepped liner 300 and the passage 302 may otherwise be the same as the stepped liner 200 and the passage 202. The profile of the passage 302 may be selected to achieve desired flow characteristics (e.g., to achieve the desired mixing, the desired wake elimination, the desired vortex interaction, etc.). The dilution flow A and the secondary flow B may substantially be the same as in the liner 200 with the secondary flow B exiting behind the dilution flow A to prevent wakes in the flow.

Figure 7A:
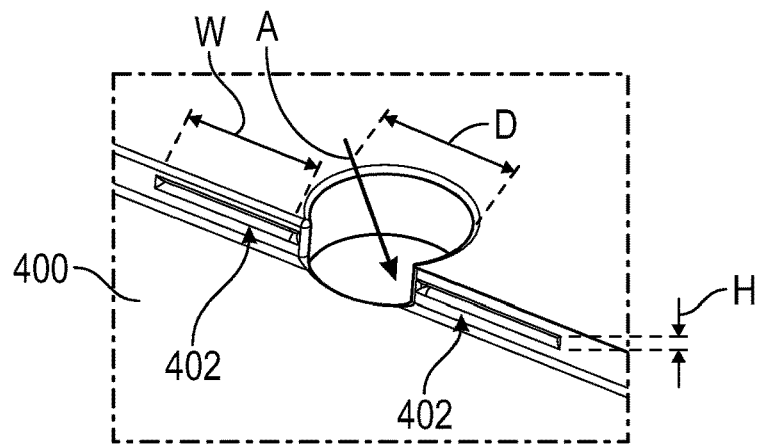
FIG. 7A shows a schematic, top perspective view of a stepped liner, according to an embodiment of the present disclosure.
Figure 7B:
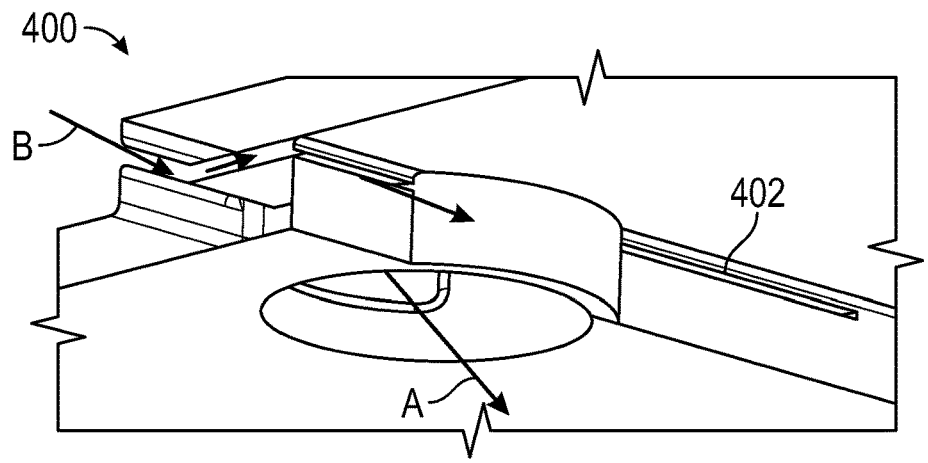
FIG. 7B shows a schematic, bottom view of the stepped liner of FIG. 7A, according to an embodiment of the present disclosure.
Figure 7C:
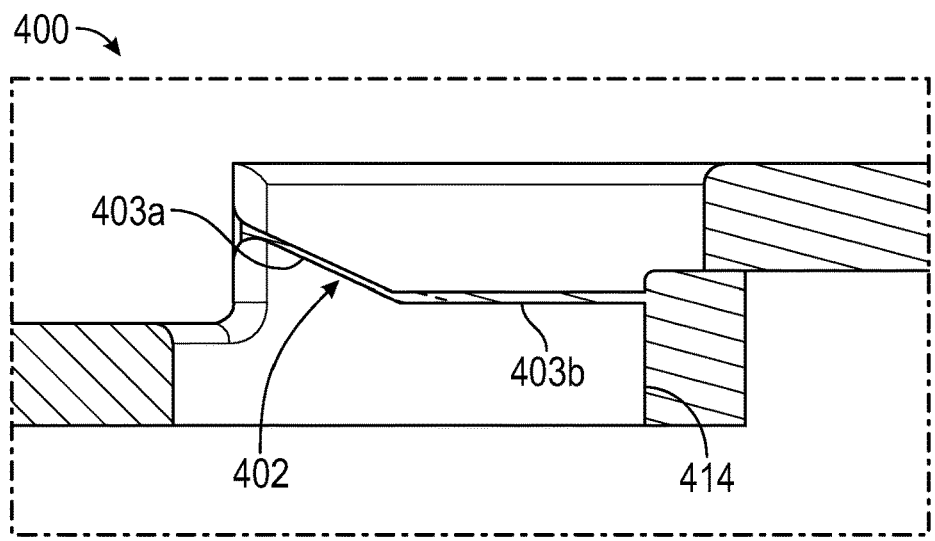
FIG. 7C shows a schematic, cross-section view through a passage of the stepped liner of FIG. 7A, according to an embodiment of the present disclosure.

Referring to FIGS. 7A-7C, schematic views of a stepped liner 400 having a passage 402 are shown. The stepped liner 400 may be the same or similar as the stepped liner 200. In the stepped liner 400, the passage 402 may have a profile that includes an angled portion 403a and a lateral portion 403b. The characteristics of the stepped liner 400 and the passage 403 may otherwise be the same as the stepped liner 200 and the passage 202. The profile of the passage 402 may be selected to achieve desired flow characteristics (e.g., to achieve the desired mixing, the desired wake elimination, the desired vortex introduction, etc.). The dilution flow A and the secondary flow B may substantially the same as in the liners 200 and 300 with the secondary flow B exiting behind the dilution flow A to prevent wakes in the flow.

Referring to FIG. 7C, the profile of the passage 402 is shown. The passage 402 may be the same as the passage 202 with a different profile. For example, the second side surface 214 in FIG. 5C may be curved in an "S" shape, whereas the second side surface 414 of FIG. 7C may be substantially the same as a portion of the perimeter of a rectangle. Furthermore, the passage 402 may be narrower (e.g., smaller in flow path) that the passage 202. The length, angle, width, diameter, and orientation of the angled portion 403a and the lateral portion 403b may be the same or different between the passage 202 and the passage 402. Any shape, orientation, length, angle, width, diameter, or other dimension or shaping of the passage may be altered to achieve the desired flow characteristics through the passage 402 (e.g., to achieve the desired mixing, the desired wake elimination, the desired vortex introduction, etc.).

Any shape, orientation, length, angle, width, diameter, or other dimension or shaping of any of the passages described herein may be altered to achieve the desired flow characteristics through the passage to include, but not limited to, to achieve the desired mixing, the desired wake elimination, the desired vortex introduction, or any combination thereof. The angle of the passage may define the direction the secondary flow B exits the passage. The direction may follow the profile of the liner and may provide a dilution flow. The angle of the passage may have a direct effect on the liner temperature. The lower the angle, the lower the temperature on exhibited on the liner. The angle of the passage may have a direct effect on NOx emissions. The greater the passage angle, the lower the dilution flow angle, but the higher the liner temperature. The passage profile (e.g., angle, orientation, and other dimensions) may be selected to balance these two characteristics.

The width (e.g., dimension W in FIG. 7A) of any of the passages may be selected based on the diameter (e.g., dimension D in FIG. 7A) of the dilution opening. The width of any of the passages may be in the range of 0.5×D to 1.0×D. The distance between the center of any two dilution openings may be 2×D. The height (e.g., dimension H in FIG. 7A) of the passage may be very small as compared to the width and diameter. For example, the height H may be on the order of magnitude of 30-40 mils. The aforementioned dimensioning is not limited to a particular embodiment described herein.

The exit angle of the passage may be shallow or steep. A shallow exit may maintain the secondary flow B close to the wall of the liner. A steep exit may maintain the secondary flow B closer to the dilution flow A. The exit angle of the passage may be selected or predetermined based on the desired flow characteristics within the liner. The aforementioned angling is not limited to a particular embodiment described herein.

Each passage in a liner may be independently selected to achieve a desired overall flow within the liner. For example, a passage on one side of the dilution opening may have a different profile, different exit angle, different diameter, different height, etc., or any combination thereof, as compared to a passage on the other side of the dilution opening and/or as compared to passages associated with other dilution openings. The profiles of the passages may be selected based on the amount of flow desired through the passage and the amount of air flow available. The passages may be symmetric about the dilution opening or asymmetric about the dilution opening. Although two passages are shown, one on either side of the dilution opening, only a single passage may be provided. The aforementioned dimensioning is not limited to a particular embodiment described herein.

The passage of the present disclosure may include an outer surface that may be around the periphery of the dilution opening to direct the secondary flow around the dilution flow. The angle (e.g., angle α) may be in the range of 15° to 75° with respect to the interior liner wall. This may have a differential benefit of mixing and/or cooling. The angle of the passage may be varied between two circumferential dilution openings. The passage may have a compounded angle, e.g., an angle or profile that changes direction. The passage around the dilution opening may be in the range of 0.7×D to 2×D on either side of the dilution opening depending on the extent of the wake mixing air required. The aforementioned dimensioning is not limited to a particular embodiment described herein.

The passage may have one or more guide vanes, such as guide vanes 103 shown in FIG. 3B, to direct the flow at the exit of the dilution (e.g., exit onto the hot side). The vanes may direct the secondary flow closer or farther from the dilution wakes. The guide vanes may extend the full length of the passage or a portion of the passage. One or two or more guide vanes may be provided in a passage. One or more guide vanes may be provided in one or more passages (e.g., in all passages or in some passages). The one or more guide vanes may be angled support and/or guide structures to direct the flow behind the dilution opening into the wake region or as desired aft of the dilution opening, that is in a high temperature region.

The passage may have an entry that includes an axially staggered feed location between dilution openings. The exit and/or the inlet point to the passage may be staggered on the same dilution opening or between different dilution openings. The exit and/or inlet may have cross-sectional areas that differ based on the desired flow and flow characteristics through the passage. The exit width may be based on the desired velocity. An inlet area larger than an outlet area may allow for an increased velocity in the secondary flow. An outlet area greater than an inlet area may allow for a decreased velocity in the secondary flow.

As discussed herein, a wake may be present in the flow (e.g., flow A) exiting the dilution opening(s). The wake may result in higher emissions and higher temperatures on the liner, as compared to the flow of the liner of the present disclosure (e.g., a liner including slots or passages exiting behind the dilution opening). The air flow from a slot or passage in a liner of the present disclosure may come around the dilution opening and purge or suppress the wake behind the dilution opening. The interaction of the secondary flow (e.g., flow B) and the dilution flow (e.g., flow A) may create a large vortex pair that may improve mixing of the primary air (e.g., flow C) with the dilution flow. Thus, the secondary flow may wash away the wake and increase mixing, keeping the wakes and hot streaks away from the liner hot side wall.

Further aspects of the present disclosure are provided by the subject matter of the following clauses.

1. A liner for a combustor in a gas turbine engine, the liner comprising: a liner body having a cold side and a hot side; a dilution opening extending through the liner body; and a passage positioned adjacent the dilution opening and extending through the liner body, wherein a dilution flow flows through the dilution opening from the cold side to the hot side and a secondary flow flows through the passage from the cold side to the hot side, wherein the secondary flow exits into the hot side behind the dilution flow, and wherein the secondary flow suppresses wakes formed behind the dilution flow on the hot side of the liner.

2. The liner of any preceding clause, wherein the dilution opening comprises a cylindrical hole extending through the liner body, the dilution opening having a central axis substantially perpendicular to an interior liner wall of the liner.

3. The liner of any preceding clause, wherein the passage is at an angle with respect to an interior liner wall of the liner.

4. The liner of any preceding clause, wherein the angle is in the range of 15 degrees to 75 degrees.

5. The liner of any preceding clause, wherein the passage comprises two passages positioned on opposing sides of the dilution opening.

6. The liner of any preceding clause, wherein the liner is a stepped liner comprising a first portion offset from a second portion.

7. The liner of any preceding clause, wherein the passage is positioned within a third portion of the liner coupling the first portion to the second portion.

8. The liner of any preceding clause, wherein the passage comprises an angled portion and a lateral portion.

9. The liner of any preceding clause, wherein the passage comprises two angled portions coupled together with a lateral portion.

10. The liner of any preceding clause, wherein the secondary flow has lower penetration into the hot side than the dilution flow.

11. The liner of any preceding clause, wherein the passage has a width that is determined based on a diameter of the dilution opening.

12. The liner of any preceding clause, wherein the width is in the range of 0.25 times and 2.0 times the diameter.

13. The liner of any preceding clause, wherein an inlet of the passage has a different dimension than an outlet of the passage, the inlet and outlet dimensions being selected based on a desired velocity of secondary flow.

14. The liner of any preceding clause, further comprising one or more guide vanes configured to direct the secondary flow behind the dilution opening and into a wake region.

15. A method for suppressing wakes in a dilution flow, the method comprising: flowing a dilution air flow from a cold side of a liner to a hot side of a liner; flowing a secondary air flow from the cold side of the liner to the hot side of the liner; and mixing the dilution air flow and the secondary air flow with a primary air cross flow flowing through the hot side of the liner, wherein the secondary air flow comes around the dilution air flow and enters the hot side behind the dilution air flow, wherein the secondary air flow suppresses a wake present behind the dilution air flow, and wherein a vortex pair is formed due to the secondary air flow mixes with the dilution air flow, the vortex pair assisting in mixing with the primary air cross flow.

16. The method of any preceding clause, wherein the secondary air flow comprises two air flows presented on opposing lateral sides of the dilution air flow.

17. The method of any preceding clause, wherein the secondary air flow is presented at an angle with respect to an interior surface of the liner.

18. The method of any preceding clause, wherein the liner is a stepped liner.

19. The method of any preceding clause, wherein the secondary air flow has lower penetration into the hot side than the dilution air flow.

20. The method of any preceding clause, further comprising directing the secondary air flow behind the dilution air flow and into a wake region using one or more guide vanes.

Although the foregoing description is directed to the preferred embodiments, it is noted that other variations and modifications will be apparent to those skilled in the art, and may be made without departing from the spirit or scope of the present disclosure. Moreover, features described in connection with one embodiment may be used in conjunction with other embodiments, even if not explicitly stated above.

The invention claimed is:

1. A liner for a combustor in a gas turbine engine, the liner comprising:
a liner body having a cold side and a hot side, the liner body comprising:
a first portion;
a second portion axially offset from the first portion; and
a third portion joining the first portion and the second portion, the third portion having a first axially facing side surface and a second axially facing side surface;
a dilution opening extending through the liner body; and
a passage positioned adjacent the dilution opening and extending through the third portion of the liner body from the cold side to the hot side, the passage having an inlet at a forward side of the dilution opening and extending through the first axially facing side surface of the third portion and an outlet extending through the second axially facing side surface of the third portion,
wherein a dilution flow flows through the dilution opening from the cold side to the hot side, and
wherein a secondary flow flows through the passage from the inlet to the outlet such that the secondary flow exits into the hot side aft of the dilution flow to suppress wakes formed aft of the dilution flow on the hot side of the liner.

2. The liner of claim 1, wherein the dilution opening comprises a cylindrical hole extending through the liner body, the dilution opening having a central axis substantially perpendicular to an interior liner wall of the liner.

3. The liner of claim 1, wherein the passage is at an angle with respect to an interior liner wall of the liner.

4. The liner of claim 3, wherein the angle is in a range of 15 degrees to 75 degrees.

5. The liner of claim 1, wherein the passage comprises two passages positioned on opposing sides of the dilution opening.

6. The liner of claim 1, wherein the passage comprises an angled portion and a lateral portion.

7. The liner of claim 1, wherein the passage comprises two angled portions coupled together with a lateral portion.

8. The liner of claim 1, wherein the secondary flow has lower penetration into the hot side than the dilution flow.

9. The liner of claim 1, wherein the passage has a width that is determined based on a diameter of the dilution opening.

10. The liner of claim 9, wherein the width is in a range of 0.25 times to 2.0 times the diameter.

11. The liner of claim 1, wherein the inlet of the passage has a different dimension than the outlet of the passage, the inlet and outlet dimensions being selected based on a desired velocity of the secondary flow.

12. The liner of claim 1, further comprising one or more guide vanes configured to direct the secondary flow aft of the dilution opening and into a wake region.

13. A method for suppressing wakes in a dilution flow, the method comprising:
flowing a dilution air flow through a dilution opening from a cold side of a liner to a hot side of the liner;
flowing a secondary air flow through a passage from the cold side of the liner to the hot side of the liner;
mixing the dilution air flow and the secondary air flow with a primary air cross flow flowing through the hot side of the liner;
suppressing a wake present aft of the dilution air flow with the secondary air flow; and
assisting in the mixing with the primary air cross flow by forming a vortex pair due to the secondary air flow mixing with the dilution air flow, wherein the secondary air flow comes around the dilution air flow and enters the hot side aft of the dilution air flow, and wherein the liner is a stepped liner comprising:
 a first portion;
 a second portion axially offset from the first portion; and
 a third portion joining the first portion and the second portion, the third portion having a first axially facing side surface and a second axially facing side surface, the passage extending through the third portion, wherein the passage has an inlet at a forward side of the dilution opening and extending through the first axially facing side surface of the third portion and an outlet extending through the second axially facing side surface of the third portion.

14. The method of claim 13, wherein the secondary air flow comprises two air flows presented on opposing lateral sides of the dilution air flow.

15. The method of claim 13, wherein the secondary air flow is presented at an angle with respect to an interior surface of the liner.

16. The method of claim 13, wherein the secondary air flow has lower penetration into the hot side than the dilution air flow.

17. The method of claim 13, further comprising directing the secondary air flow aft of the dilution air flow and into a wake region using one or more guide vanes.

18. A liner for a combustor in a gas turbine engine, the liner comprising:
 a liner body having a cold side and a hot side, the liner body comprising:
  a first portion;
  a second portion axially offset from the first portion; and
  a third portion joining the first portion and the second portion, the third portion having a first axially facing side surface and a second axially facing side surface;
 a dilution opening extending through the liner body; and
 a passage positioned adjacent the dilution opening and extending through the third portion of the liner body from the cold side to the hot side, the passage having a rectangular cross-section, an inlet at a forward side of the dilution opening and extending through the first axially facing side surface of the third portion, and an outlet extending through the second axially facing side surface of the third portion, wherein a dilution flow flows through the dilution opening from the cold side to the hot side, and wherein a secondary flow flows through the passage from the inlet to the outlet such that the secondary flow exits into the hot side aft of the dilution flow to suppress wakes formed aft of the dilution flow on the hot side of the liner.

* * * * *